US010237136B2

(12) United States Patent
Wang et al.

(10) Patent No.: US 10,237,136 B2
(45) Date of Patent: *Mar. 19, 2019

(54) METHOD OF DISTRIBUTING NETWORK POLICIES FOR DATA COMPUTE NODES IN A DATACENTER

(71) Applicant: Nicira, Inc., Palo Alto, CA (US)

(72) Inventors: Hua Wang, Beijing (CN); Jianjun Shen, Beijing (CN); Donghai Han, Beijing (CN); Caixia Jiang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,671

(22) Filed: Feb. 17, 2017

(65) Prior Publication Data

US 2017/0163487 A1    Jun. 8, 2017

Related U.S. Application Data

(63) Continuation of application No. 14/503,268, filed on Sep. 30, 2014, now Pat. No. 9,575,794.

(51) Int. Cl.
*G06F 9/455* (2018.01)
*H04L 12/24* (2006.01)

(52) U.S. Cl.
CPC ...... *H04L 41/0896* (2013.01); *G06F 9/45533* (2013.01); *G06F 9/45558* (2013.01); *H04L 41/0893* (2013.01); *H04L 41/20* (2013.01); *H04L 41/5006* (2013.01); *G06F 2009/45595* (2013.01)

(58) Field of Classification Search
None
See application file for complete search history.

(56) References Cited

U.S. PATENT DOCUMENTS

| 8,966,084 B2 | 2/2015 | Dow et al. |
| 9,529,619 B2 | 12/2016 | Wang et al. |
| 9,575,794 B2 | 2/2017 | Wang et al. |

(Continued)

FOREIGN PATENT DOCUMENTS

WO    2015032430    3/2015

OTHER PUBLICATIONS

Ballani, Hitesh., et al., "Towards Predictable Datacenter Networks," SIGCOMM' 11, Aug. 15-19, 2011, 12 pages, ACM, Toronto, Canada.

(Continued)

*Primary Examiner* — Bing Zhao
(74) *Attorney, Agent, or Firm* — Adeli LLP

(57) ABSTRACT

A method of allocating network bandwidth in a network that includes several tenant virtual machines (VMs). The method calculates a first bandwidth reservation for a flow between a source VM and a destination VM that are hosted on two different host machines. The source VM sends packets to a first set of VMs that includes the destination VM. The destination VM receives packets from a second set of VMs that includes the source VM. The method receives a second bandwidth reservation for the flow calculated at the destination. The method sets the bandwidth reservation for the flow as a minimum of the first and second bandwidth reservations.

20 Claims, 13 Drawing Sheets

(56) References Cited

U.S. PATENT DOCUMENTS

| | | | |
|---|---|---|---|
| 2011/0205925 A1* | 8/2011 | Anderson | H04L 45/00 370/252 |
| 2015/0134830 A1 | 5/2015 | Popa et al. | |

OTHER PUBLICATIONS

Cherkasova, Ludmila., et al., "Comparison of the Three CPU Schedulers in Xen," ACM SIGMETRICS Performance Evaluation Review, Sep. 2007, 10 pages, vol. 35 Issue 2, ACM, New York, United States.

Gulati, Ajay., et al., "PARDA: Proportional Allocation of Resources for Distributed Storage Access," USENIX FAST 09 Conference, Feb. 26, 2009, 30 pages, VMware, Inc.

Guo, Chuanxiong., et al., "Secondnet: a Data Center Network Virtualization Architecture With Bandwidth Guarantees," ACM CoNEXT 2010, Nov. 30-Dec. 3, 2010, 12 pages, ACM, Philadelphia, United States.

Jeyakumar, Vimalkumar., et al., "EyeQ: Practical Network Performance Isolation at the Edge," 10th USENIX Symposium on Networked Systems Design and Implementation (NSDI '13), 2013, pp. 297-311, USENIX Association.

Lam, Terry., et al., "NetShare: Virtualizing Data Center Networks Across Services," May 19, 2010, 13 pages, available at http://csetechrep.ucsd.edu/Dienst/UI/2_0/Describe/ncstrl.ucsd_cse/CS2010-0957.

Perlman, R., et al. "Routing Bridges (RBridges)—Base Protocol Specification. RFC6325," Jul. 2011, 176 pages, available at https://tools.ietf.org/html/rfc6325.

Popa, Lucian., et al., "ElasticSwitch: Practical Work-Conserving Bandwidth Guarantees for Cloud Computing," SIGCOMM'13, Aug. 12-16, 2013, 12 pages, ACM, Hong Kong, China.

Popa, Lucian., et al., "FairCloud: Sharing the Network in Cloud Computing," SIGCOMM'12, Aug. 13-17, 2012, 12 pages, ACM, Helsinki, Finland.

Raiciu, Costin., et al., "Improving Datacenter Performance and Robustness with Multipath TCP," In ACM SIGCOMM Computer Communication Review—SIGCOMM '11, Aug. 2011, 12 pages, vol. 41, Issue 4, ACM, New York.

Rodrigues, Henrique., et al., "Gatekeeper: Supporting Bandwidth Guarantees for Multi-Tenant Datacenter Networks," 2011, 8 pages, In USENIX WIOV, available at https://www.usenix.org/legacy/events/wiov11/tech/final_files/Rodrigues.pdf.

Shieh, Alan., et al., "Sharing the Data Center Network," 2011, 14 pages, In USENIX NSDI, available at https://www.usenix.org/legacy/events/nsdi11/tech/full_papers/Shieh.pdf.

* cited by examiner

METHOD OF DISTRIBUTING NETWORK POLICIES FOR DATA COMPUTE NODES IN A DATACENTER

CLAIM OF BENEFIT TO PRIOR APPLICATIONS

This application is a continuation of U.S. patent application Ser. No. 14/503,268, filed Sep. 30, 2014, and now published as U.S. Patent Publication 2016/0094328. U.S. patent application Ser. No. 14/503,268, now published as U.S. Patent Publication 2016/0094328, is incorporated herein by reference.

BACKGROUND

Software defined data centers (SDDCs) virtualize the physical network to provide isolated virtual networks for respective tenants. In order to achieve this goal, the network resource has to be shared among multiple unrelated tenants. For resources such as computation, memory and storage, which are allocated locally, there have already been some effective sharing mechanisms. But for network resource, fair sharing is more challenging because it is distributed by its nature and involves multiple components.

Significant research has addressed the problem of how to share the network in data centers, especially how to share the bandwidth resources among tenants in a fair manner. Some proposed solutions enforce the traffic control at the edge, while others require control in middle physical nodes. The software-based edge control is a more feasible direction, because changes to physical nodes (e.g. switches and routers) are expensive, slow to standardize, and hard to customize once deployed. Existing edge control approaches introduce a scheduler at the hypervisor. The scheduler allocates the bandwidth among entities, which are typically virtual machines (VMs) or flows identified by source-destination VM pairs, based on the entities' policies. The policy usually contains bandwidth reservation, share, and limit. With a feedback mechanism, the allocation is changed periodically. However, these approaches calculate the allocations without considering the peers' weight. All peers are treated equally, and the VM's policy is just divided equally to them.

BRIEF SUMMARY

Some embodiments utilize a centralized controller to distribute VM network policies. The controller is able to identify all peers that a VM could potentially communicate with, and pushes their network policies to the virtualization software (also referred to as hypervisor) on the host of the VM. The controller also pushes the VM's policy to the virtualization software on the hosts of the potential peers. The network policy (also referred to as the bandwidth allocation policy or bandwidth sharing policy) of a VM includes the bandwidth reservation, limit, and share. The reservation is the minimum bandwidth guaranteed to a VM, the limit is the maximum allowed bandwidth for the VM, and the share is the weight used to calculate the VM's share of spare bandwidth. Subsequently the virtualization software uses the policies to calculate bandwidth allocations for both sending and receiving, and hence improve sharing fairness.

The peers usually run on other hosts. To share the bandwidth fairly among the VMs, the virtualization software needs to know the network policies of the VMs that communicate with each other. The centralized controller receives the network policies of all VMs in the datacenter. However, distributing every VM policy to every virtualization software could be very time consuming. In a large data center, there could be millions of VMs and sending all VMs' policies to each hypervisor causes a lot of extra overhead.

However, a VM usually only communicates with a small number of peers. Some embodiments provide a method that for each VM, identifies all other peer VMs that can potentially communicate with the VM. The controller then sends the policies of the identified peer VM's to the virtualization software on the host of the VM. The controller also sends the VM's policy to the virtualization software of the identified peer VMs.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

I. Sharing of Network Bandwidth Among VMs

In a datacenter that includes a large number of unrelated tenants, the available network bandwidth has to be fairly shared among VMs of different tenants. Fairness requires that when there is congestion or when there is extra available bandwidth, each flow to get a fair share of the available bandwidth.

A. Network Views

Figure 1:
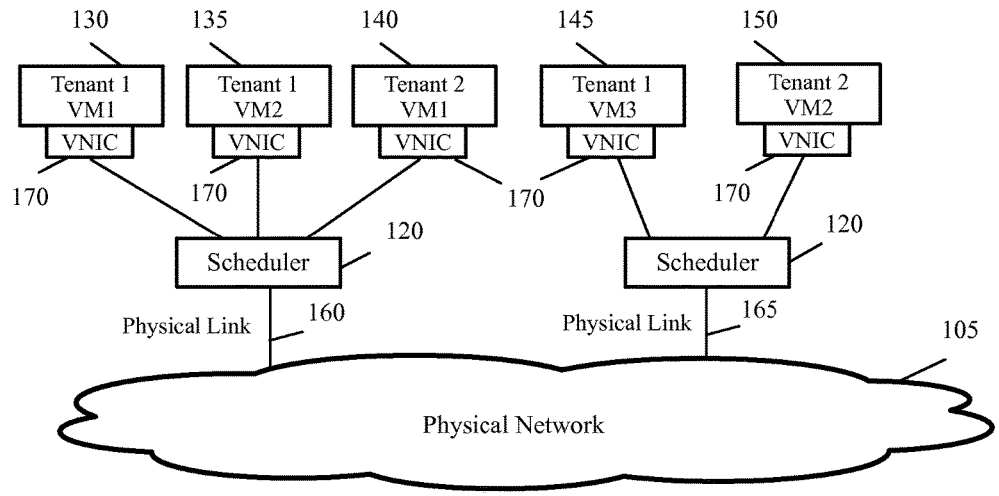
FIG. 1 conceptually illustrates a physical network view in some embodiments of the invention.

In network virtualization there are two levels of views: physical view and virtual view. FIG. 1 conceptually illustrates a physical network view in some embodiments of the invention. The figure shows the physical view abstraction for a datacenter that has VMs for multiple tenants. As shown, Tenant 1 has three VMs 130, 135, and 145. Tenant 2 has two VMs 140 and 150. The VMs 130-150 connect to the physical network 105 through physical links 160-165. To simplify the description, each VM 130-150 is assumed to have only one virtual network interface controller (VNIC) 170. However, if a VM has multiple VNICs, the VM can be viewed as multiple VMs, each with one VNIC.

As shown in the figure, each physical link can be shared by multiple VMs, which can belong to multiple tenants. A scheduler 120 between the VMs and the physical link is responsible for fairly sharing the network bandwidth among the VMs.

Figure 2:
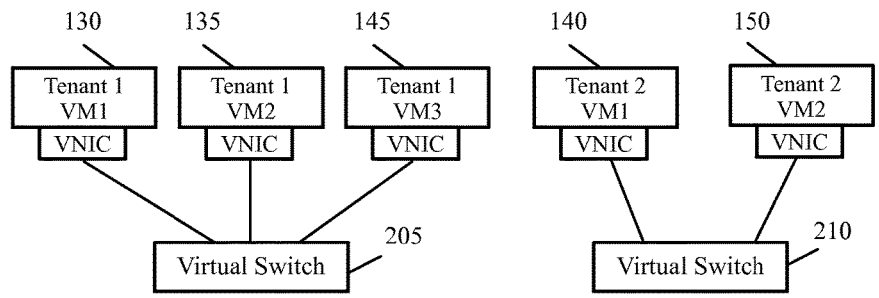
FIG. 2 conceptually illustrates a virtual network view in some embodiments of the invention.

FIG. 2 conceptually illustrates a virtual network view in some embodiments of the invention. The figure shows the virtual view of the system of FIG. 1 as a tenant sees. FIG. 2 shows a hose model in which all VMs of a tenant appear to be connected to a single virtual switch. For instance, VMs 130, 135, and 145 of Tenant 1 appear to be connected to virtual switch 205 while VMs 140 and 150 of tenant 2 appear to be connected to virtual switch 210. The hose model provides quality of service (QoS) based on the aggregate network traffic per each network endpoint (e.g., per tenant 130-150 shown in FIG. 2).

B. The Bandwidth Scheduler

The bandwidth scheduler is responsible for allocating a link's bandwidth among active VM flows. The flow is defined as all the packets from a source VM to a destination VM. A flow's scheduling policy has three parameters: reservation, limit, and share.

Reservation defines the minimum guaranteed bandwidth. The reservation is the lower bound that is guaranteed even if the bandwidth is heavily utilized. Some embodiments provide admission control mechanisms to ensure that the sum of the reservations for the bandwidth does not exceed the total capacity.

Limit is the maximum bandwidth that can be used even if more bandwidth is available. Limit is the upper bound on the bandwidth usage even if the bandwidth is under committed. A VM is prevented from using more bandwidth than the VM's bandwidth limit, even if that leaves some network bandwidth unused.

Share is the weight used for allocating spare bandwidth. Share specifies relative importance. The share is expressed as an absolute value or a percentage. In addition to a VM's guaranteed bandwidth reservation, the VM is allowed to share the spare bandwidth (up to the VM's bandwidth limit) as a fraction of the total shares when there is contention for the bandwidth.

Some embodiments control the competition for bandwidth at the source side, since dropping packets at the source side instead of the destination side saves physical bandwidth. The scheduler in some embodiments determines the competition at both the sending and receiving sides and uses the competition to control the bandwidth at the sending side.

Figure 3:
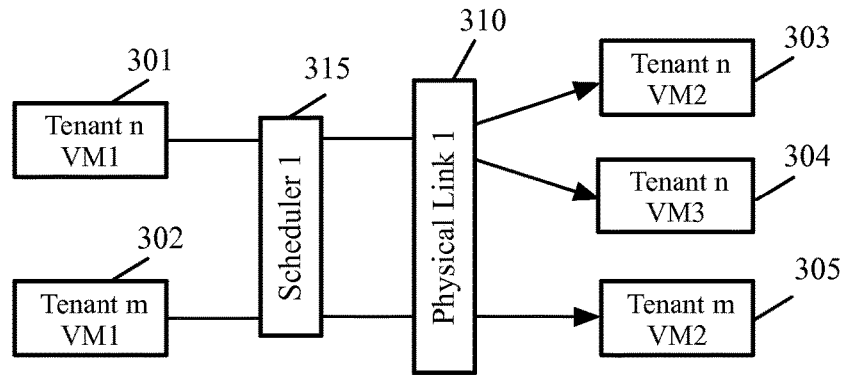
FIG. 3 conceptually illustrates competition for sending packets in some embodiments of the invention.

At the sending side, the scheduler detects the competition directly. FIG. 3 conceptually illustrates competition for sending packets in some embodiments of the invention. As shown in the example of FIG. 3, VM 301 sends packets to VM 303 and 304, and VM 302 sends packets to VM 305. VM 301 and VM 302 share the same physical link 310 and compete for the bandwidth at the sending side. The scheduler 315 at the sending side detects the competition between VM 301 and VM 302 directly. Details of bandwidth calculation at the sending side are described further below.

The sending side scheduler, however, does not know how to allocate the receiver side bandwidth since there could be other senders on other hosts that send packets to the destination VM. Only the receiver knows how to allocate the bandwidth at the receiving side. Some embodiments provide a feedback mechanism from the receiving side to notify the sending side when a competition happens. For instance, some embodiments provide a dedicated feedback packet to provide competition information to the sending side. The feedback also carries calculated scheduling information. The receiver calculates the bandwidth allocation and sends the calculation results to the sender using the feedback packet. Details of bandwidth calculation at the receiving side are described further below.

Figure 4:
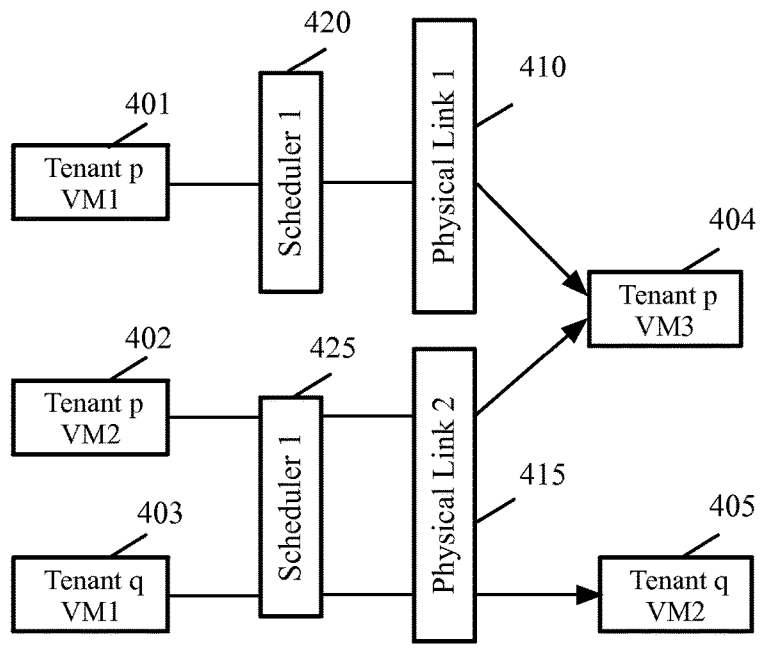
FIG. 4 conceptually illustrates competition for receiving packets in some embodiments of the invention.

FIG. 4 conceptually illustrates competition for receiving packets in some embodiments of the invention. As shown, VM 404 receives packets from VM 401 through physical link 410 and from VM 402 through physical link 415. VM 405 receives packets from VM 403 through physical link 415. There is competition at VM 404 to receive packets from VMs 401 and 402. The virtualization software on the VM 404 host calculates bandwidth allocations and sends feedback to schedulers 420 and 425 at both physical links 410 and 415. In some embodiments, when the competition continues, feedback packets are sent periodically.

After receiving the feedback, the sending side schedulers slow down of the traffic (if necessary) from VMs 401 and 402 to VM 404. If there is no feedback for a while, the sending speed is gradually increased. The speed adjustment takes the previously received feedback information into account. Some embodiments utilize a weighted version of TCP congestion control mechanism to control the rate and share the extra spare bandwidth among the active VMs. For instance, the unallocated bandwidth or the bandwidth that is reserved for some VMs but is currently unused is borrowed and is distributed among the active VMs based on the shares specified in their network policies.

II. Controller Based Sharing of Network Policies

Some embodiments utilize a controller-based network sharing approach to share bandwidth among VMs. A centralized controller (or a centralized cluster of controllers) is used in some embodiments to distribute VMs' network policies. Some embodiments calculate flow's scheduling policy based on active peers' policies.

Figure 5:
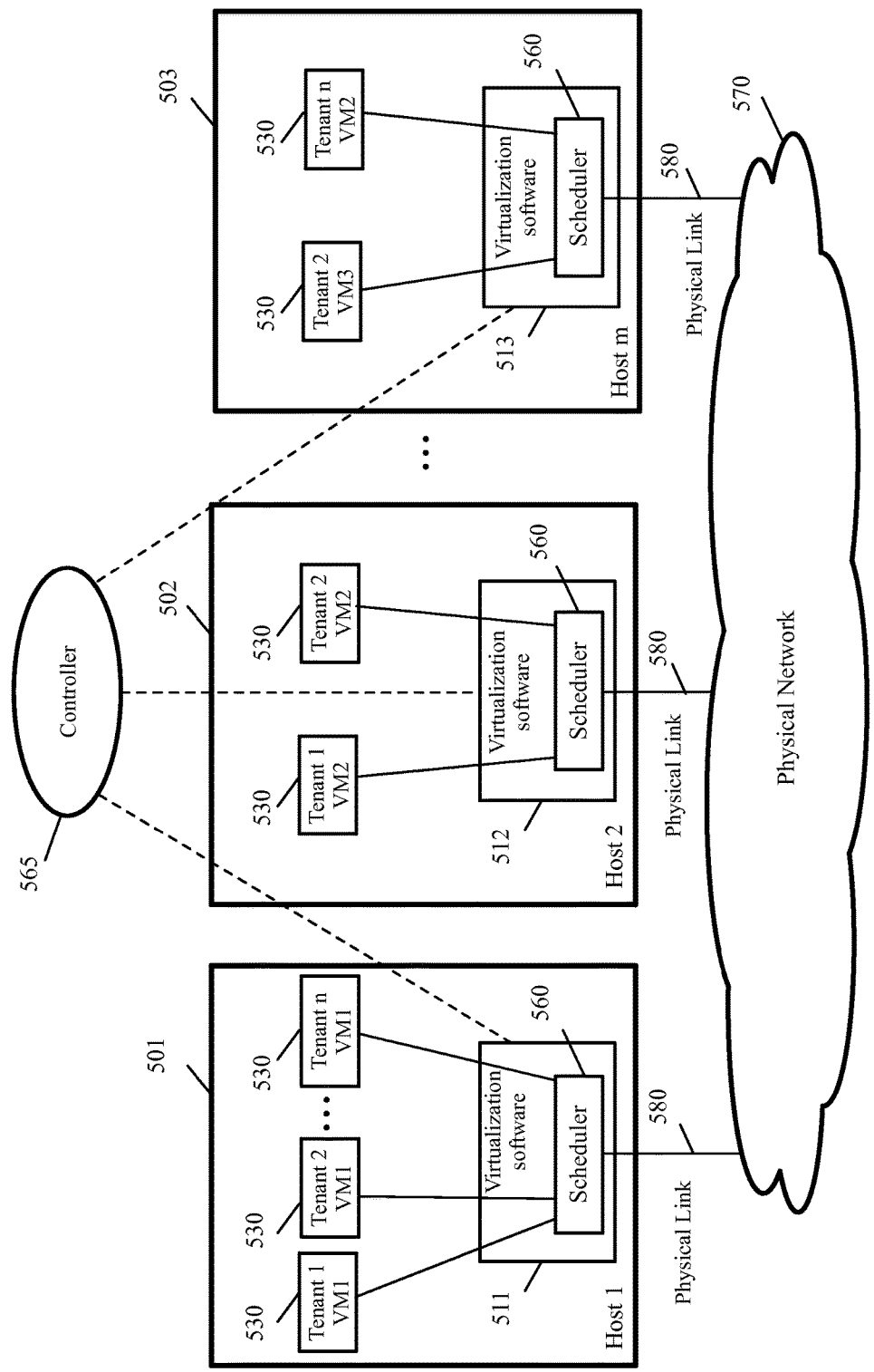
FIG. 5 conceptually illustrates a central controller for receiving and distributing virtual machines network policies in some embodiments of the invention.

FIG. 5 conceptually illustrates a central controller for receiving and distributing virtual machines network policies in some embodiments of the invention. The figure shows several hosts 501-503. The virtualization software (or hypervisor) 511-513 on each host includes a scheduler 560. The schedulers 560 located between the VMs 530 and the physical links 580 are responsible for allocating the network bandwidth among VMs. the physical links 580 connect the hosts 501-503 to a physical network 570.

Each virtualization software has a dedicated connection to a centralized controller 565, which is used for exchanging information regarding VMs network policies. Although a single node 565 is shown in FIG. 5 for simplicity, the centralized network policy distribution controller in some embodiments is a cluster (or a set) of controllers. The use of a cluster of controller provides, e.g., reliability and allows load balancing among the controllers in the cluster.

In some embodiments, network policy distribution controller is implemented on a set of physical devices. Each physical device includes a set of processing units, a set of machine readable media that are executable by the processing units, and storage.

A. Sending VM Network Policies to the Controller

Figure 6:
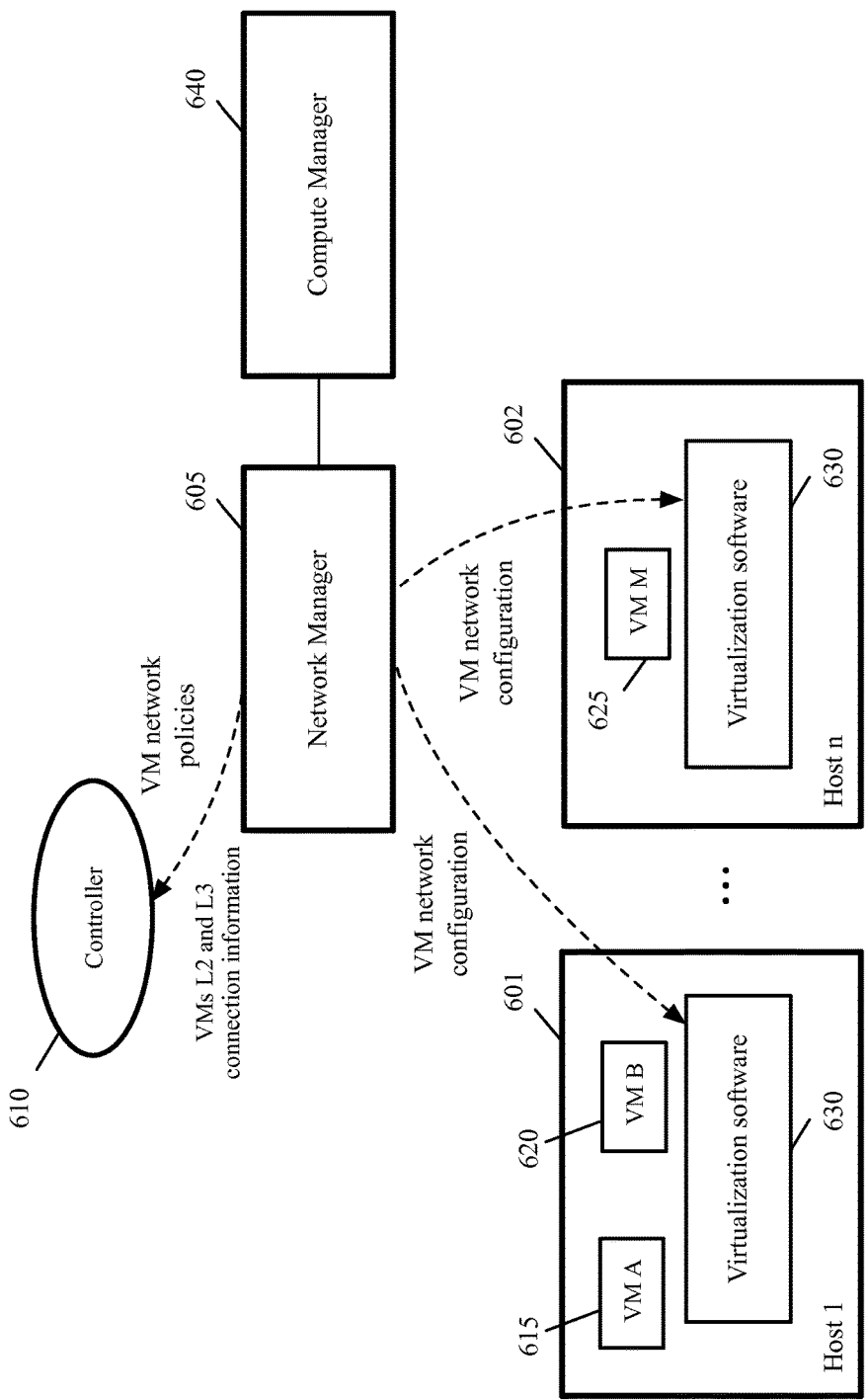
FIG. 6 conceptually illustrates sending virtual machines' network policies to a central controller in some embodiments of the invention.

In some embodiments, the network policy distribution controller receives VMs network policies during the VM deployment. In other embodiments, the controller collects the VMs' network policies from each virtualization software. FIG. 6 conceptually illustrates sending virtual machines' network policies to a central controller in some embodiments of the invention. As shown, the system includes several hosts 601-602 with virtualization software 630.

At the time of the deployment of a VM (e.g., when a configured VM is powered on and becomes active or when a VM is moved from one host to another host) the VM network configuration is sent to the host's virtualization software. A portion of the VM network policy (i.e., the VM's bandwidth reservation, bandwidth limit, and bandwidth share) is sent to the controller 610. The VM bandwidth reservation is the minimum bandwidth that is guaranteed for the VM. The VM bandwidth limit is the maximum bandwidth that the VM can use. The VM bandwidth share is the weight used for allocating additional bandwidth (over the guaranteed reservation) to the VM when spare bandwidth is divided among active VMs.

Different embodiments configure and deploy VMs differently. As shown in FIG. 6, the compute manager 640 configures the VMs 615-625. In some embodiments, the compute manager also configures VM's network connections through the network manager 605. In these embodiments, the compute manager controls the management and modification of virtual switches, virtual ports, etc. In other embodiments, the network manager controls the management and modification of these entities. Network manager 605 and compute manger 640 are software that function as servers, are deployed as appliances, and may reside on physical or virtual computer systems (not shown). As with controller 610, network manager 605 and compute manager 640 may be provided as individual servers or as clusters of servers to provide scalability, fail-over, and load balancing capability.

The compute manager 640 is a component of the SDDC that is used to create and configure computing resources such as the VMs and the storage in the SDDC. In some embodiments, network manager is a part of the compute manager while in other embodiments, the compute and network managers are separate entities. In either case, when the compute manager deploys a VM, the VM network policy (i.e., the bandwidth reservation, bandwidth limit, and bandwidth share) is sent to the controller. In addition, Open Systems Interconnection (OSI) model Layer 2 (L2) and Layer 3 (L3) connection information of the VM (e.g., the virtual switches or virtual routers that the VMs are connected to) is sent to the controller.

Figure 7:
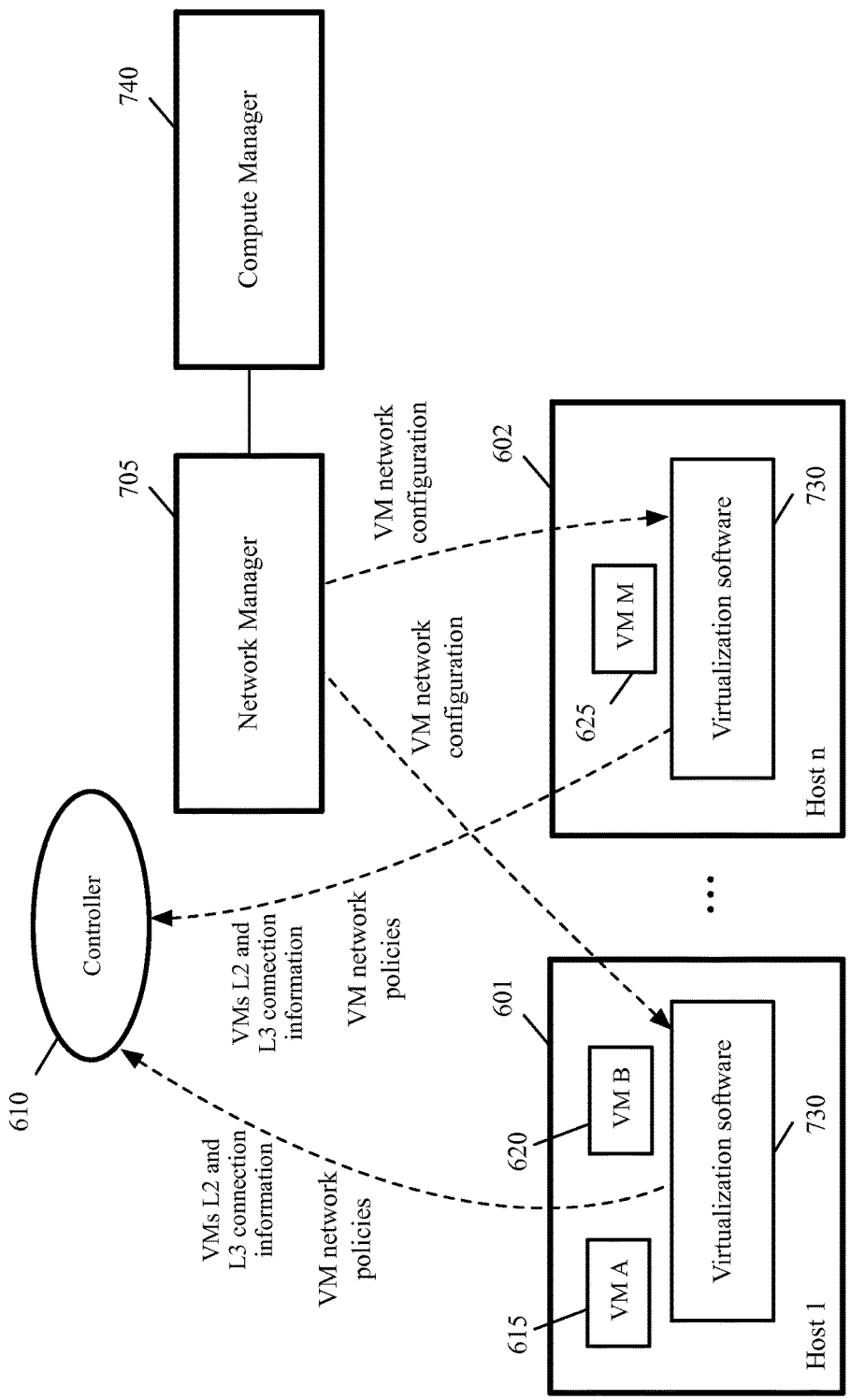
FIG. 7 conceptually illustrates a central controller receiving virtual machines' network policies from hosts' virtualization software in some embodiments of the invention.

FIG. 7 conceptually illustrates a central controller receiving virtual machines' network policies from hosts' virtualization software in some embodiments of the invention. The configuration and deployment of VMs 615-625 by the compute manager 740 and network manager 705 in FIG. 7 is similar to the embodiments described by reference to FIG. 6. However, in FIG. 7, the controller 610 receives the VM network policies from virtualization software 730 in each host 701-702. For instance, the virtualization software 730 in each host is configured to send a copy of a VM's network policies and VM's L2 and L3 connection information to the controller 610 when the virtualization software activates the VM.

B. Distribution of VM Network Policies

The controller in some embodiments uses a reactive query model to distribute VMs network policies to hypervisors. In other embodiments, the controller uses a proactive push model to distribute the policies. In query model, when a VM on a host starts communicating with a new peer, the virtualization software on the host queries the peer's policy from the controller and stores the policy (e.g., in cache). In some embodiments, when the communication with a peer idles for a predetermined period, the peer's policy is deleted from the host storage (e.g., is removed from the cache), by a timeout mechanism. In the push model, the controller sends the policies of potential peers to virtualization software in advance. These policies in some embodiments never expire.

Figure 8:
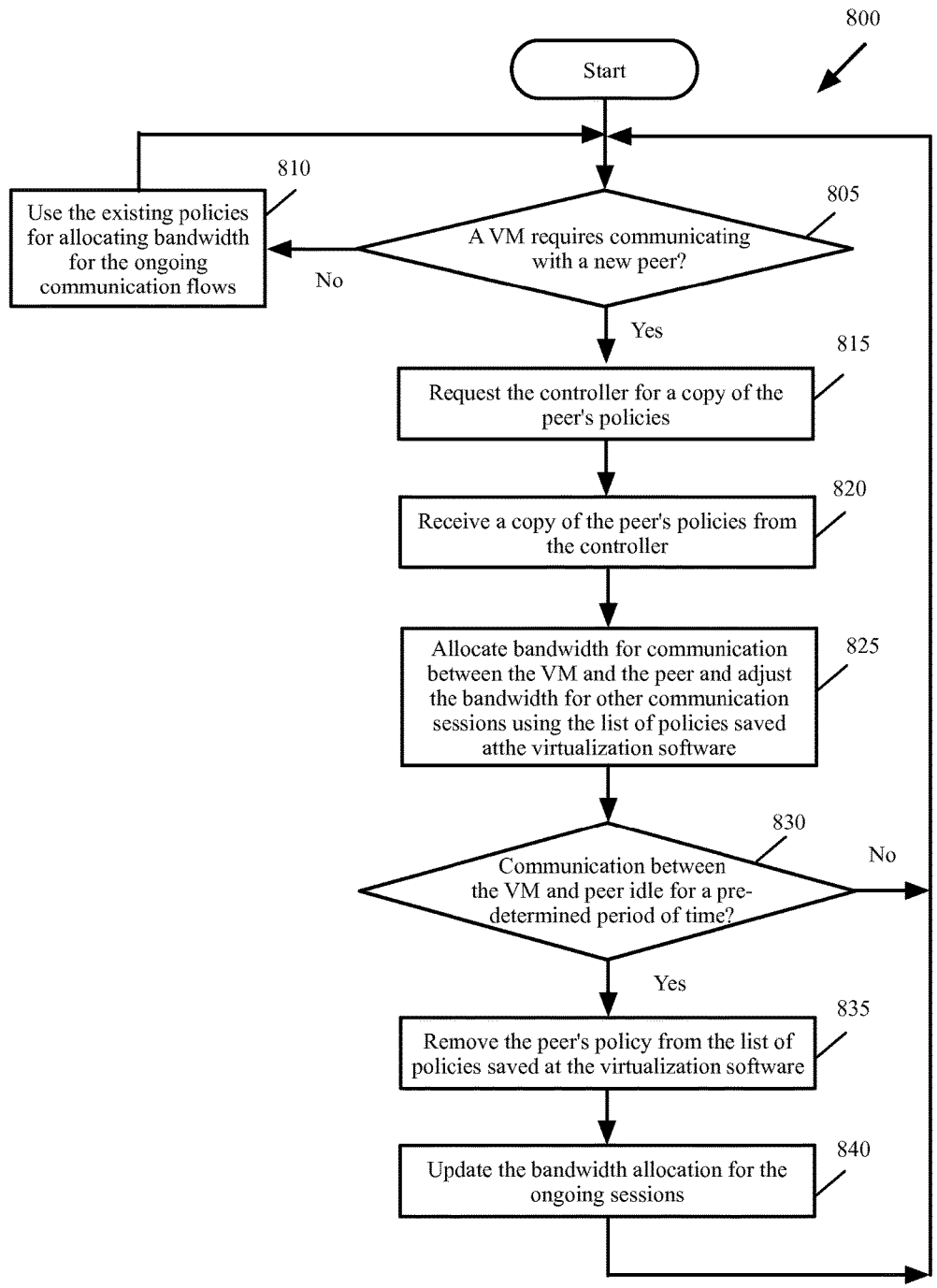
FIG. 8 conceptually illustrates a process for on demand sending of peer network policies to virtualization software in some embodiments of the invention.

FIG. 8 conceptually illustrates a process 800 for on demand sending of peer network policies to virtualization software in some embodiments of the invention. Process 800 is performed by virtualization software in some embodiments. As shown, the process determines (at 805) whether a VM requires communicating with a new peer. If not, the process uses (at 810) the existing policies for allocating bandwidth for the ongoing communication flows. The process then returns to 805, which was described above.

Otherwise, the process requests (at 815) the controller for a copy of the peer's network policies. The polices in some embodiments include bandwidth reservation, limit, and share for the peer VM. The process then receives (at 820) the peer's network policies from the controller. The process then allocates (at 825) bandwidth for communication between the VM and the peer and adjusts the bandwidth for other communication flows using the list policies stored at the virtualization software. Details of allocating bandwidth using the VM policies are described further below.

The process then determines (at 830) whether communication between the VM and the peer is idle for a predetermined period of time. If not, the process proceeds to 805, which was described above. Otherwise, the process removes (at 835) the peer's policy from the list of policies saved at the virtualization software. The process then updates (at 840) the bandwidth allocation for the ongoing flows. The process then proceeds to 805, which was described above.

Other embodiments use a proactive push model to distribute VMs policies. The advantage of the proactive push model is when a new flow is initiated (i.e., when two VMs start communicating), no delay is caused by a query to get the peer's policy. However, the controller has to determine the set of potential peers for each VM on a host in order to push the peers' policy to the appropriate virtualization software. A simple solution would be to push all policies to every host's virtualization software. However, this solution would cause extensive overhead in a SDDC with thousands of hosts.

The set of potential peers can be reduced based on the fact that a VM only communicates with other VMs connected to the same virtual switch. In some embodiments, the virtualization software includes a physical forwarding element (PFE) such as a virtual switch. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. In other words, the software forwarding elements are referred to as PFEs because they exist and operate in the physical world, whereas LFEs are a logical representation of a forwarding element that is presented to a user when designing a logical network. In some embodiments, several PFEs are distributed throughout the network implement tenant's LFEs, where each PFE is a local instantiation of an LFE that operate across different host machines and can perform L3 packet forwarding between VMs on the host machine or on different host machines. An LFE is sometimes referred to as a virtual distributed switch (VDS).

The set of peers of a VM includes all VMs that are connected to the same LFEs or PFEs as the VM. For VMs connected to other LFEs or PFEs, the traffic needs to go through a virtual gateway. The virtual gateway has its own policy to shape the traffic across the layer 2 boundary. The controller, therefore, requires to only handle internal traffic. The list of LFE and PFEs that VMs are connected to are sent to the controller as the VMs' L2 connection information as described by reference to FIGS. 6-7 above.

The controller, therefore, only needs to push the policies of those VMs that connect to the same LFEs/PFEs. A host's virtualization software can hold multiple VMs connecting to different virtual switches. The controller has to push the policies of all VMs of these switches.

Figure 9:
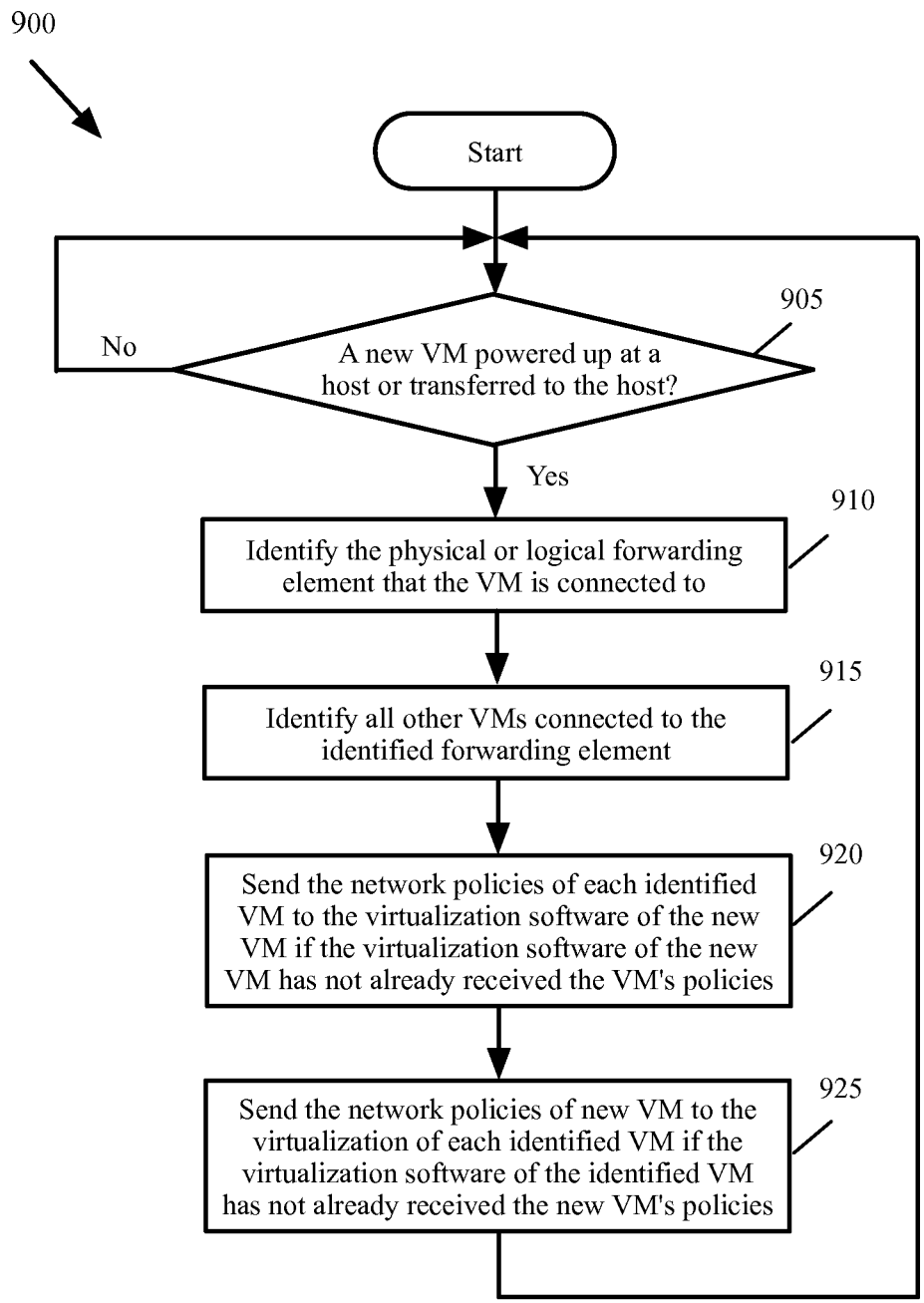
FIG. 9 conceptually illustrates a process for proactive sending of peer network policies to virtualization software in some embodiments of the invention.

FIG. 9 conceptually illustrates a process 900 for proactive sending of peer network policies to virtualization software in some embodiments of the invention. Process 900 in some embodiments is performed by the controller. As shown, the process determines (at 905) whether a new VM is powered up at a host or is transferred to the host. If not, the process back to 905 (e.g., after a predetermined delay). Otherwise, the process identifies (at 910) the physical or logical forwarding elements that the VM is connected to.

The process then identifies (at 915) all other VMs on any hosts that are connected to the identified PFEs or LFEs. These are all VMs that can potentially communicate with the new VM. For instance, as described by reference to FIGS. 6 and 7 above, the controller 610 receives L2 and L3 connection information of the VMs (e.g., the virtual switches or virtual routers that the VMs are connected to) from the network manager 605 (as described by reference to FIG. 6) or from the virtualization software 730 of each host (as described by reference to FIG. 7).

The process then sends (at 920) the network policies of each identified VM to the virtualization software of the new VM if the virtualization of the new VM has not already received the VM's policies. The process then sends (at 925) the network policies of the new VM to the virtualization software of each identified VM if the virtualization software of the identified VM has not already received the new VM's policies. The process then proceeds to 905, which was described above.

C. Distribution of VM Network Policies in a Virtual Distributed Router Domain

Figure 10:
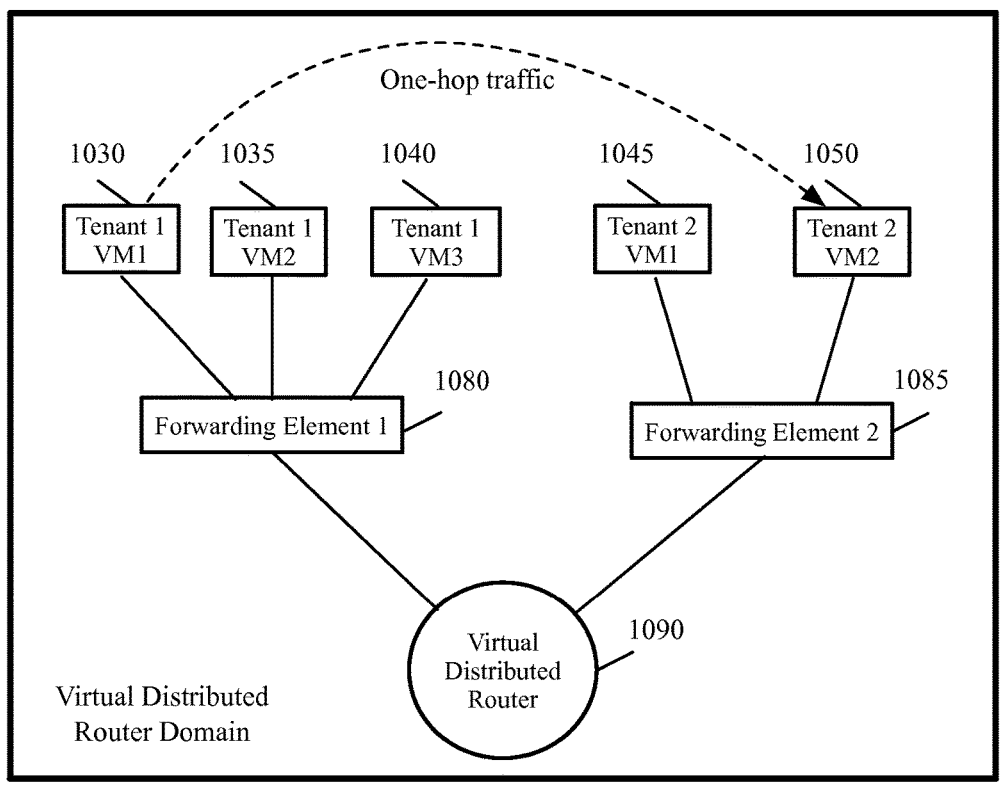
FIG. 10 conceptually illustrates a logical view of a network with a virtual distributed router in some embodiments of the invention.

Some embodiments utilize a virtual distributed router (VDR). A VDR introduces one-hop routing that enables a packet to be sent to a VM of another LFE or PFE directly, without going through a gateway. FIG. 10 conceptually illustrates a logical view of a network with a virtual distributed router in some embodiments of the invention. As shown, a set of VMs 1030-1040 is connected to a first forwarding element (i.e., an LFE or a PFE) 1080. Another set of VMs 1045-1050 is connected to a second forwarding element 1085.

The figure shows the one-hop traffic. Logical forwarding elements 1080 and 1085 connect to a VDR 1090. The VDR in some embodiments is implemented by including a local instantiation of the VDR in each virtualization software that connects to the VDR. At the data path, the VDR instance on each virtualization software forwards the traffic from a local VM to a remote VM of another virtual switch directly without going through a gateway.

As there is no gateway on the data path to do the traffic control, the bandwidth control has to be performed by each host virtualization software. In order for to calculate the flow policy based on the source VM and destination VM's policies, the controller has to send a wider range of policies to the virtualization software. A VDR domain is defined to contain all virtual switches connected to the VDR. For every VM pair within the domain, their traffic can reach each other directly. The controller, therefore, has to push the policies of all VMs belonging to a VDR domain. The information regarding the VDRs that VMs are connected to is sent to the controller as the VMs' L3 connection information as described by reference to FIGS. 6-7 above.

Figure 11:
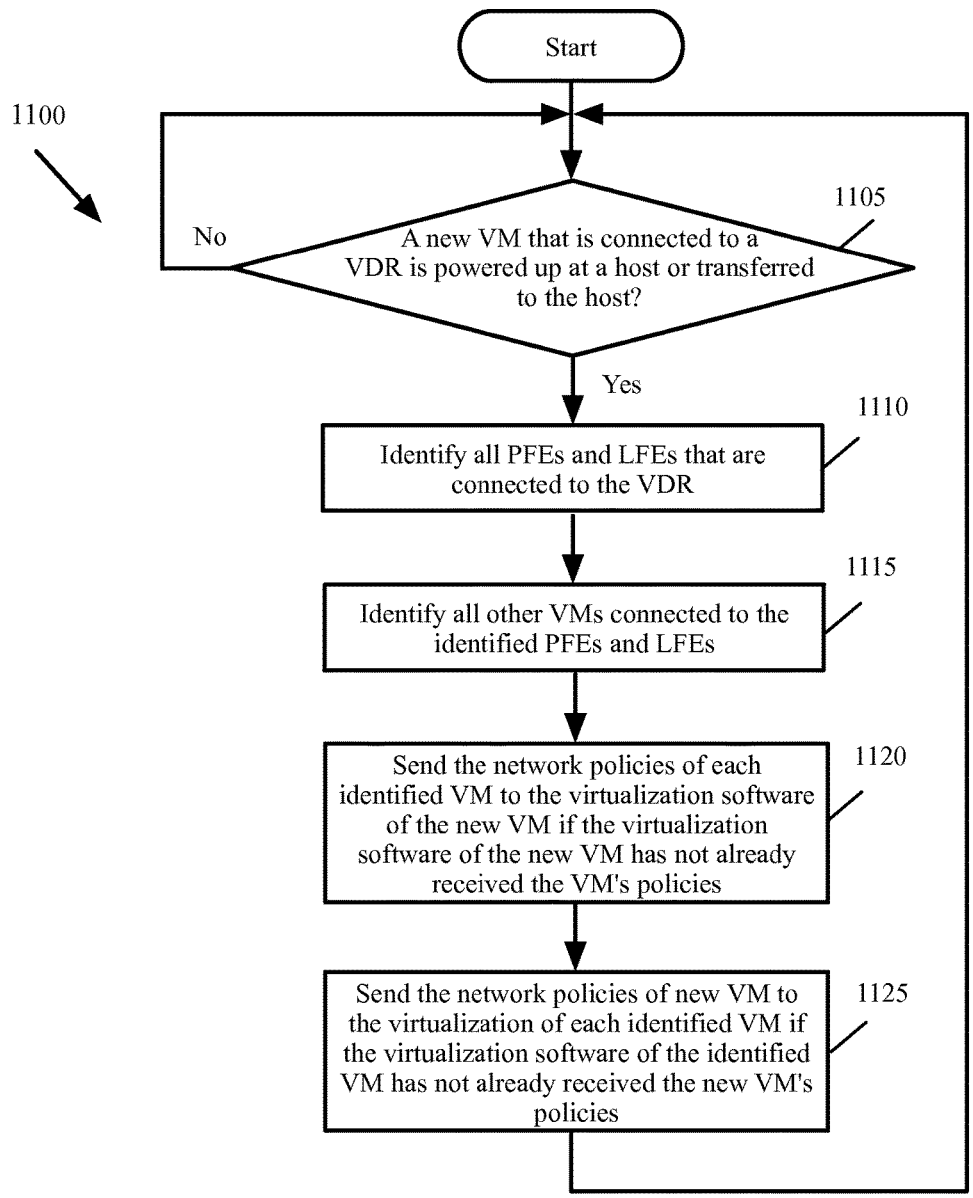
FIG. 11 conceptually illustrates a process a push model to send network policies to virtualization software in a system with a virtual distributed router in some embodiments of the invention.

FIG. 11 conceptually illustrates a process 1100 for a push model to send network policies to virtualization software in a system with a virtual distributed router in some embodiments of the invention. As shown, the process determines (at 1105) whether a new VM that is connected to a VDR is powered up at a host or is transferred to the host from another host. If not, the process proceeds back to 1105 (e.g., after a predetermined delay).

Otherwise, the process identifies (at 1110) all PFEs and LFEs that are connected to the VDR. The process then identifies (1115) all other VMs that are connected to the identified PFEs and LFEs. The process then sends (at 1120) the network policies of each identified VM to the virtualization software of the new VM if the virtualization of the new VM has not already received the VM's policies. The process then sends (at 1125) the network policies of the new VM to the virtualization software of each identified VM if the virtualization software of the identified VM has not already received the new VM's policies. The process then proceeds to 1105, which was described above.

In alternative embodiments, the VDR's network policy is used as the flow policy for the traffic flow between the VMs.

Because the VDR includes a number of instances on each hypervisor instead of a central node, the VDR network policy has to be distributed to each virtualization software using the controller. Currently the routing information has been dispatched using the controller. The flow policies have to be added to the dispatching process.

III. Flow Policy Calculation with Run-Time Information

The flow policy used to allocate bandwidth to the data flow between two VMs is derived from the two VMs' policies. The flow's policy is calculated based on active peers by taking the active peers' policies in account. To calculate the accurate data for the scheduler, run-time information including the number of active VMs and periodic statistical data is required. Feedback packets sent by destination virtualization software to the source virtualization software are used to determine the number of active VMs. The feedback mechanism provides the periodical statistical data. The run-time information is used to calculate the bandwidth allocation. A flow's policy includes reservation, share and limit, which are calculated as described below.

A. Calculation of Bandwidth Reservation for Traffic Flow Between Two VMs

The sending side calculates the flow's reservation as follows. Assuming that a source VM, s, is sending packets to a destination VM set, d. The reservation of s is $R_s$ and the reservation of each destination VM of d∈D (i.e., destination d belongs to the set of destinations D) is $R_d$. Then the reservation of the flow between VM s and VM d is:

$$R^s_{s-d} = R_s \times \frac{R_d}{\sum_{i \in D} R_i}$$

At the receiving side, assuming that a destination VM d is receiving packets from a source VM set s, the reservation of VM d is $R_d$ and the reservation of s∈S is $R_s$. Then the reservation of the flow between s and d is:

$$R^d_{s-d} = R_d \times \frac{R_s}{\sum_{i \in S} R_i}$$

Now both the sending and receiving sides calculate a flow reservation. The sending side is egress reservation and the receiving side is ingress reservation. The receiving side sends the result to the sending side via the feedback packet. Then the sending side chooses a smaller one as the final reservation for the flow:

$$R_{s-d} = \min(R_{s-d}^s, R_{s-d}^d)$$

Figure 12:
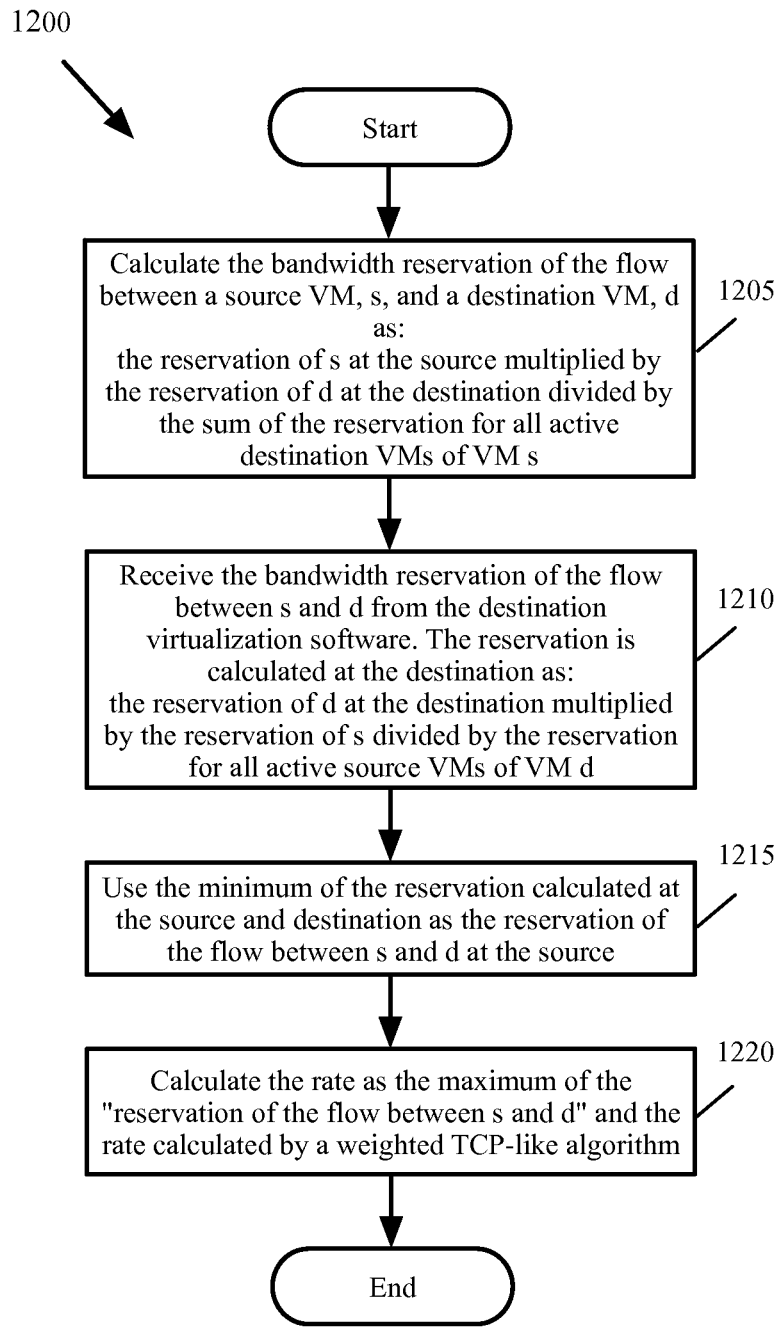
FIG. 12 conceptually illustrates a process for calculating bandwidth reservation for flow between two virtual machines in some embodiments of the invention.

FIG. 12 conceptually illustrates a process 1200 for calculating bandwidth reservation for flow between two virtual machines in some embodiments of the invention. Process 1200 is performed in some embodiments by the virtualization software of the source VM. As shown, the process calculates (at 1205) the bandwidth reservation of the flow between a source VM, s, and a destination VM, d. The bandwidth is calculated as the reservation of s multiplied by the reservation of d, divided by the sum of the reservation of all active destinations that are communicating with VM s (i.e., the reservation of all active peers of VM s). In other words, the reservation (or minimum guaranteed bandwidth) of VM s is proportionally divided for the flow between VM s and each active peer of VM s.

The process then receives (at 1210) the bandwidth reservation of the flow between s and d from the virtualization software of the destination. The bandwidth is calculated by the virtualization software of the destination as the reservation of d multiplied by the reservation of s divided by the sum of the reservation of all active source VMs that are sending packets to VM d (i.e., the reservation of all active peers of VM d). In other words, the reservation (or minimum guaranteed bandwidth) of VM d is proportionally divided for the flow between VM s and each active peer of VM d.

The process then calculates (at 1215) the reservation of the flow between VM s and VM d as the minimum of the reservation of VM s calculated at the source and the reservation of VM d calculated at the destination. The process then calculates (at 1220) the rate (i.e., the actual bandwidth to use) for the flow between VM s and VM d as:

$$B_{s-d} = \max(R_{s-d}, R_{w-TCP})$$

where $B_{s-d}$ is the rate for the flow between VM s and VM d and $R_{w-TCP}$ is the rate calculated by using a weighted TCP-like algorithm. The process then exits.

B. Calculation of Bandwidth Limit for Traffic Flow Between Two VMs

The sending side calculates the flow's limit (i.e., the maximum bandwidth that can be used for the flow) as follows. Assuming that a source VM s is sending packets to a destination VM set d. The limit of s is $L_s$ and the limit of each destination VM of d∈D (i.e., destination d belongs to the set of destinations D) is $L_d$. Then the limit of the flow between VM s and VM d is:

$$L^s_{s-d} = L_s \times \frac{L_d}{\sum_{i \in D} L_i}$$

At the receiving side, assuming that a destination VM d is receiving packets from a source VM set s, the limit of VM d is $L_d$ and the limit of s∈S is $L_s$. Then the limit of the flow between s and d is:

$$L^d_{s-d} = L_d \times \frac{L_s}{\sum_{i \in S} L_i}$$

Both the sending and receiving sides calculate a flow limit. The sending side is egress limit and the receiving side is ingress limit. The receiving side sends the result to the sending side via the feedback packet. Then the sending side chooses a smaller one as the final limit for the flow:

$$L_{s-d} = \min(L_{s-d}^s, L_{s-d}^d)$$

Figure 13:
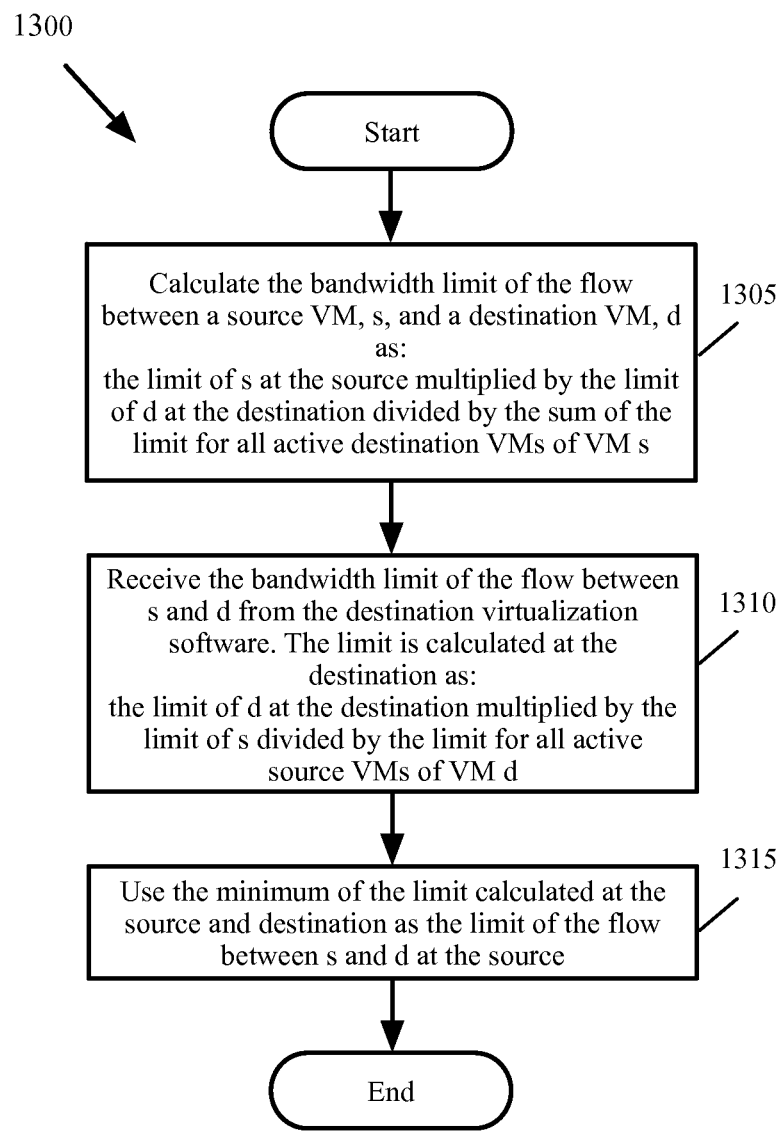
FIG. 13 conceptually illustrates a process for calculating bandwidth limit for flow between two virtual machines in some embodiments of the invention.

FIG. 13 conceptually illustrates a process 1300 for calculating bandwidth limit for flow between two virtual machines in some embodiments of the invention. Process 1300 is performed in some embodiments by the virtualization software of the source VM. As shown, the process calculates (at 1305) the bandwidth limit of the flow between a source VM, s, and a destination VM, d. The bandwidth limit is calculated as the limit of s multiplied by the limit of d, divided by the sum of the limit of all active destinations that are communicating with VM s (i.e., the bandwidth limit of all active peers of VM s). In other words, the limit (or maximum allowed bandwidth) of VM s is proportionally divided for the flow between VM s and each active peer of VM s.

The process then receives (at 1310) the bandwidth limit of the flow between s and d from the virtualization software of the destination. The bandwidth limit is calculated by the virtualization software of the destination as the limit of d multiplied by the limit of s divided by the sum of the limit of all active source VMs that are sending packets to VM d (i.e., the limit of all active peers of VM d). In other words, the limit (or maximum allowed bandwidth) of VM d is proportionally divided for the flow between VM s and each active peer of VM d.

The process then calculates (at 1315) the limit of the flow between VM s and VM d as the minimum of the limit of VM s calculated at the source and the limit of VM d calculated at the destination. The process then exits.

C. Calculation of Bandwidth Share for Traffic Flow Between Two VMs

The sending side calculates the flow's share (i.e., the weight used to calculate the share of spare bandwidth that can be allocated to the flow) as follows. Assuming that a source VM s is sending packets to a destination VM set d. The share of s is $S_s$ and the share of each destination VM of d∈D (i.e., destination d belongs to the set of destinations D) is $S_d$. Then the share of the flow between VM s and VM d is:

$$S_{s-d}^s = S_s \times \frac{S_d}{\sum_{i \in D} S_i}$$

At the receiving side, assuming that a destination VM d is receiving packets from a source VM set s, the share of VM d is $L_d$ and the share of s∈S is $S_s$. Then the share of the flow between s and d is:

$$S_{s-d}^d = S_d \times \frac{S_s}{\sum_{i \in S} S_i}$$

Both the sending and receiving sides calculate a share for the flow. The sending side is egress share and the receiving side is ingress share. The receiving side sends the result to the sending side via the feedback packet. Then the sending side chooses a smaller one as the final share for the flow:

$$S_{s-d} = \min(S_{s-d}^s, S_{s-d}^d)$$

Figure 14:
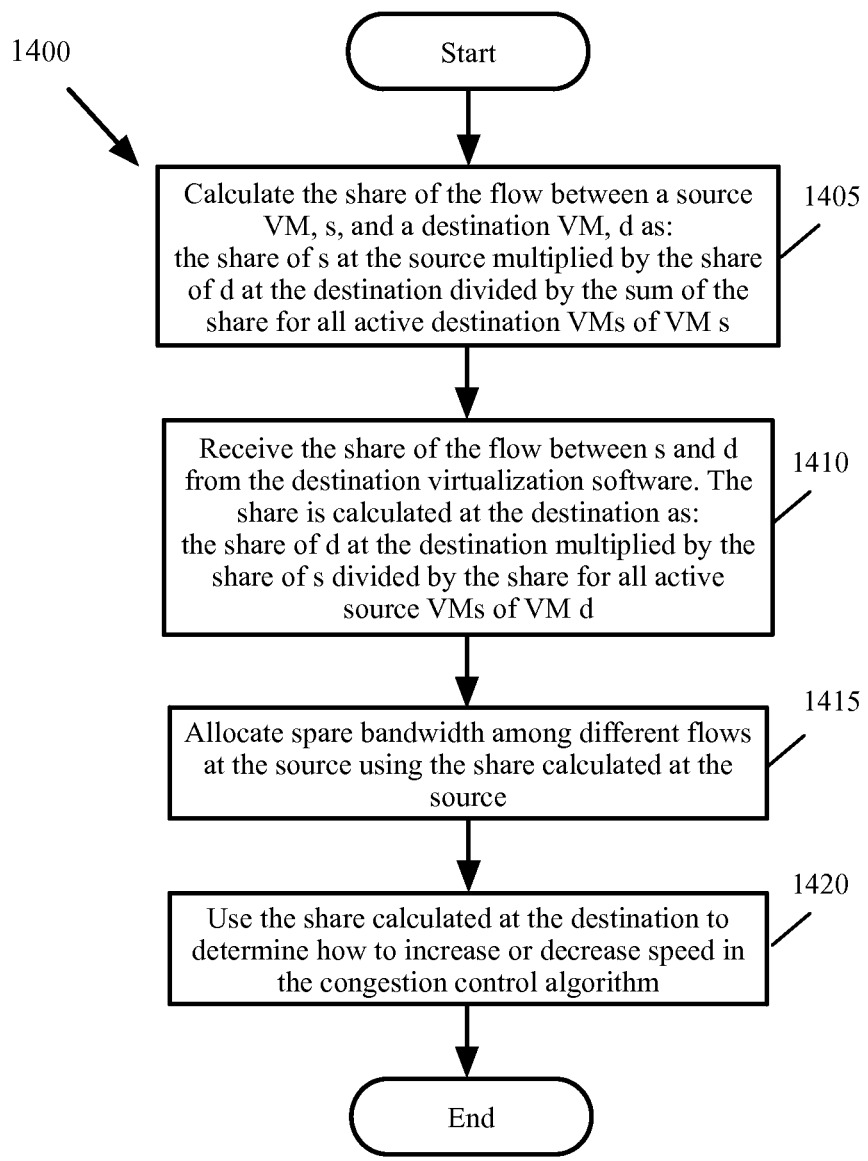
FIG. 14 conceptually illustrates a process for calculating share for the flow between two virtual machines in some embodiments of the invention.

FIG. 14 conceptually illustrates a process 1400 for calculating share for the flow between two virtual machines in some embodiments of the invention. Process 1400 is performed in some embodiments by the virtualization software of the source VM. As shown, the process calculates (at 1405) the share of the flow between a source VM, s, and a destination VM, d. The share is calculated as the share of s multiplied by the share of d, divided by the sum of the share of all active destinations that are communicating with VM s (i.e., the share of all active peers of VM s). In other words, the share (or the weight used to calculate the spare bandwidth) of VM s is proportionally divided for the flow between VM s and each active peer of VM s.

The process then receives (at 1410) the share of the flow between s and d from the virtualization software of the destination. The share is calculated by the virtualization software of the destination as the share of VM d multiplied by the share of VM s divided by the sum of the share of all active source VMs that are sending packets to VM d (i.e., the share of all active peers of VM d). In other words, the share (or maximum allowed bandwidth) of VM d is proportionally divided for the flow between VM s and each active peer of VM d.

The process then allocates (at 1415) spare bandwidth among different flows at the source using the share calculated at the source for VM s and the share for other active VMs at the source. The process then uses (at 1420) the share calculated at the destination to determine how to increase or decrease speed to control the traffic congestion (e.g., by using the share calculated at the destination in a congestion control algorithm). The process then exits.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
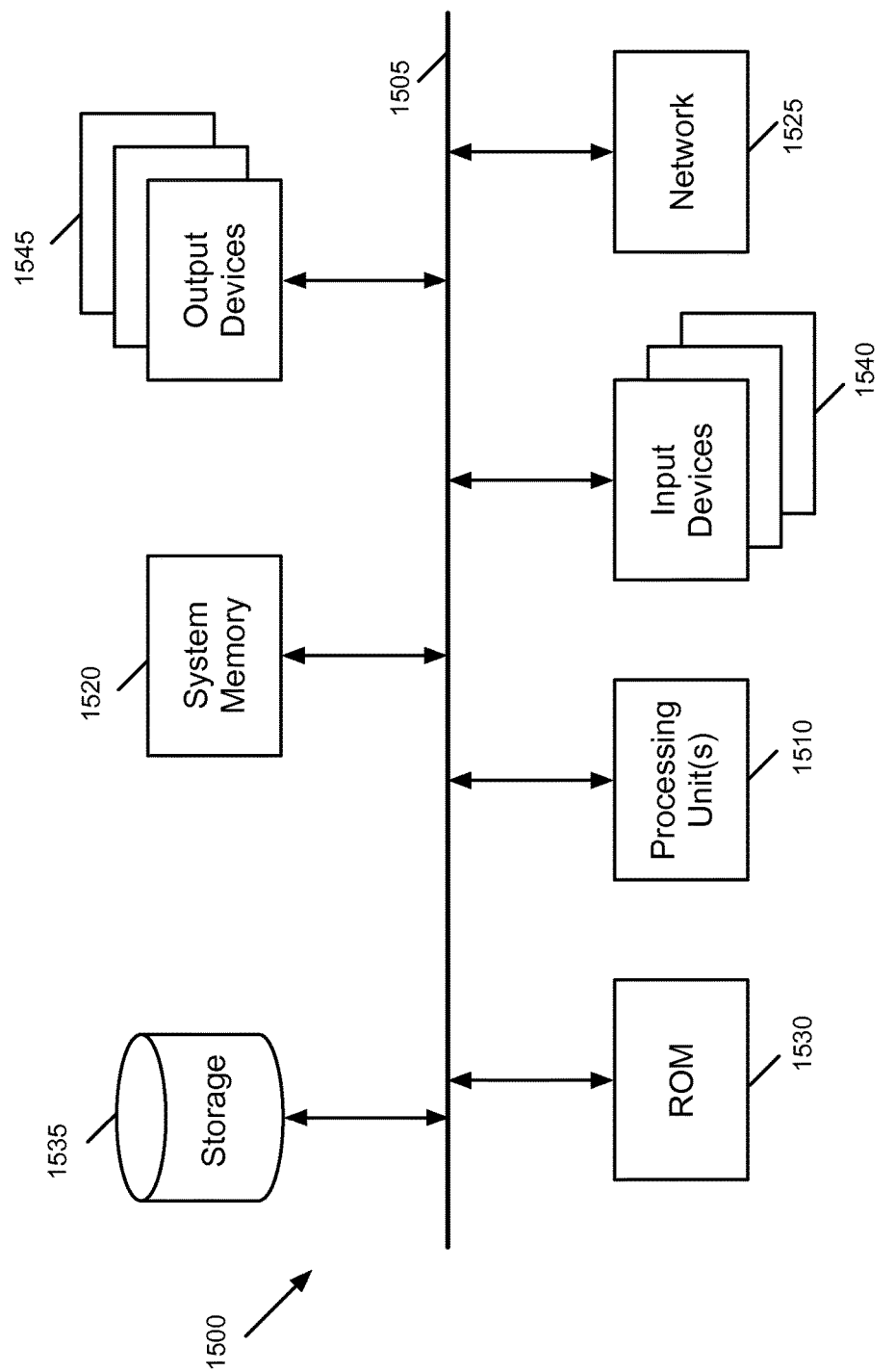
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1520, a read-only memory (ROM) 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1520, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1520 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1520, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 8-9 and 11-14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of allocating bandwidth for a particular data compute node (DCN) executing on a particular host computer, the method comprising:
at the particular host computer:
receiving, from a network controller, a network bandwidth allocation policy of each DCN in a plurality of peer DCNs including the particular DCN, the network bandwidth allocation policy for each DCN specifying a minimum bandwidth amount that should be allocated to the DCN, wherein the plurality of peer DCNs connect to a logical forwarding element (LFE), wherein the LFE spans multiple host computers on which the peer DCNs execute and is implemented by physical forwarding elements that are managed by the network controller;
storing the received plurality of network bandwidth allocation policies; and
using the stored network bandwidth allocation policy of the particular DCN and the stored network bandwidth allocation policy of each other peer DCN to allocate a network bandwidth amount for flows between the particular DCN and the peer DCN.

2. The method of claim 1, wherein the LFE is a logical router.

3. The method of claim 1, wherein the network bandwidth allocation policy for the particular DCN and each other peer DCN comprises a bandwidth reservation that specifies a minimum guaranteed bandwidth for flows between the particular DCN and the other peer DCN.

4. The method of claim 1, wherein the network bandwidth allocation policy for the particular DCN and each other peer DCN comprises a bandwidth limit that specifies a maximum allowed bandwidth for flows between the particular DCN and the other peer DCN.

5. The method of claim 1, wherein at least a subset of the DCNs are virtual machines (VMs).

6. The method of claim 1, wherein the particular host computer is a first host computer, and the first host computer on which the particular DCN operates allocates bandwidth for flows between the particular DCN and a peer DCN that operates on a second host computer by calculating a first bandwidth reservation for the flow, receiving a second bandwidth reservation for the flow from the second host computer, and selecting one of the first and second bandwidth reservations.

7. The method of claim 6, wherein the first host computer calculates the first bandwidth reservation for a flow by multiplying a bandwidth reservation for the particular DCN by a bandwidth reservation for the peer DCN on the second host computer and dividing the result by a sum of bandwidth reservations for the particular DCN and a set of the peer DCNs to which the particular DCN sends data.

8. The method of claim 6, wherein the selected bandwidth reservation is the lesser of the first and second bandwidth reservations.

9. A non-transitory machine readable medium storing a network controller program which when executed by at least one processing unit manages a network, the network controller program comprising sets of instructions for:
for each DCN of a plurality of DCNs, receiving a network bandwidth allocation policy for the DCN specifying a set of bandwidth amounts to be allocated for flows to and from the DCN, the set of bandwidth amounts comprising at least one of a minimum bandwidth amount, a maximum bandwidth amount, and a priority for allocating spare bandwidth;
identifying a set of potential communication peer DCNs connected to a same logical forwarding element (LFE), wherein the LFE spans multiple host computers on which the peer DCNs execute and is implemented by physical forwarding elements, managed by the network controller, that operate on the multiple host computers; and
for each particular DCN, distributing the network bandwidth allocation policy of the particular DCN and the network bandwidth allocation policies for the other DCNs in the identified set of potential communication peer DCNs for the particular DCN to a host computer on which the particular DCN operates, wherein the host computer on which the particular DCN operates stores the distributed network bandwidth allocation policies and uses the stored network bandwidth allocation policies of the particular DCN and each other peer DCN to allocate bandwidth for flows between the particular DCN and each other peer DCN.

10. The non-transitory machine readable medium of claim 9, wherein the network bandwidth allocation policy for a particular DCN and each of its peer DCNs comprises a bandwidth limit that specifies a maximum allowed bandwidth for flows between the particular DCN and the other peer DCN.

11. The non-transitory machine readable medium of claim 10, wherein virtualization software of a particular host computer on which the particular DCN operates stores the network bandwidth allocation policy for the particular DCN and for each peer DCN.

12. The non-transitory machine readable medium of claim 9, wherein at least a subset of the DCNs are containers.

13. The non-transitory machine readable medium of claim 9, wherein a first host computer on which the particular DCN operates allocates bandwidth for flows between the particular DCN and a DCN that operates on a second host computer by calculating a first bandwidth reservation for the flow, receiving a second bandwidth reservation for the flow from the second host computer, and selecting one of the first and second bandwidth reservations.

14. The non-transitory machine readable medium of claim 13, wherein the first host computer calculates the first bandwidth reservation for a flow by multiplying a bandwidth reservation for the particular DCN by a bandwidth reservation for the DCN on the second host computer and dividing the result by a sum of bandwidth reservations for the particular DCN and a set of DCNs to which the particular DCN sends data.

15. A non-transitory machine readable medium storing a program which when executed by at least one processing unit of a particular host computer manages a network, the program comprising sets of instructions for:
receiving, from a network controller, a network bandwidth allocation policy of each DCN in a plurality of peer DCNs including the particular DCN, the network bandwidth allocation policy for each DCN specifying a minimum bandwidth amount that should be allocated to the DCN, wherein the plurality of peer DCNs connect to a logical forwarding element (LFE), wherein the LFE spans multiple host computers on which the peer DCNs execute and is implemented by physical forwarding elements that are managed by the network controller;

storing the received plurality of network bandwidth allocation policies; and using the stored network bandwidth allocation policy of the particular DCN and the stored network bandwidth allocation policy of each other peer DCN to allocate a network bandwidth amount for flows between the particular DCN and the peer DCN.

16. The non-transitory machine readable medium of claim 15, wherein the network bandwidth allocation policy for the particular DCN and each other peer DCN comprises a bandwidth reservation that specifies a minimum guaranteed bandwidth for flows between the particular DCN and the other peer DCN.

17. The non-transitory machine readable medium of claim 15, wherein a first host computer allocates bandwidth between the particular DCN that operates on the first host computer and a peer DCN that operates on a second host computer based on the stored bandwidth allocation policies for the particular DCN and the peer DCN operating on the second host computer.

18. The non-transitory machine readable medium of claim 15, wherein the particular host computer is a first host computer, and the first host computer on which the particular DCN operates allocates bandwidth for flows between the particular DCN and a peer DCN that operates on a second host computer by calculating a first bandwidth reservation for the flow, receiving a second bandwidth reservation for the flow from the second host computer, and selecting one of the first and second bandwidth reservations.

19. The non-transitory machine readable medium of claim 18, wherein the first host computer calculates the first bandwidth reservation for a flow by multiplying a bandwidth reservation for the particular DCN by a bandwidth reservation for the peer DCN on the second host computer and dividing the result by a sum of bandwidth reservations for the particular DCN and a set of the peer DCNs to which the particular DCN sends data.

20. The non-transitory machine readable medium of claim 15, wherein at least two different network bandwidth allocation policies for at least two different DCNs in the identified set of peer DCNs specify different network bandwidth amounts.

* * * * *